(12) United States Patent
Allen et al.

(10) Patent No.: US 9,542,093 B2
(45) Date of Patent: Jan. 10, 2017

(54) METHODS AND APPARATUS FOR PROVIDING PARTIAL MODIFICATION OF A DIGITAL ILLUSTRATION

(71) Applicant: FiftyThree, Inc., New York, NY (US)

(72) Inventors: Andrew S. Allen, Norwalk, CT (US);
Julian Walker, Jersey City, NJ (US);
Amit Pitaru, Brooklyn, NY (US)

(73) Assignee: FiftyThree, Inc., New York, NY (US)

( * ) Notice: Subject to any disclaimer, the term of this patent is extended or adjusted under 35 U.S.C. 154(b) by 317 days.

(21) Appl. No.: 14/272,109

(22) Filed: May 7, 2014

(65) Prior Publication Data
US 2014/0337783 A1 Nov. 13, 2014

Related U.S. Application Data

(60) Provisional application No. 61/820,473, filed on May 7, 2013.

(51) Int. Cl.
*G06F 3/0488* (2013.01)
*G06F 3/0484* (2013.01)

(52) U.S. Cl.
CPC ....... *G06F 3/04883* (2013.01); *G06F 3/04845* (2013.01); *G06F 2203/04805* (2013.01); *G06F 2203/04808* (2013.01)

(58) Field of Classification Search
None
See application file for complete search history.

(56) References Cited

U.S. PATENT DOCUMENTS

| | | | | |
|---|---|---|---|---|
| 5,542,036 A | * | 7/1996 | Schroeder | G06T 17/10 345/424 |
| 5,977,981 A | * | 11/1999 | Brown | G06T 11/001 345/441 |
| 6,337,925 B1 | * | 1/2002 | Cohen | G06T 7/0083 382/164 |
| 6,606,105 B1 | * | 8/2003 | Quartetti | G06F 3/0481 715/203 |
| 6,633,305 B1 | | 10/2003 | Sarfeld | |
| 7,102,651 B1 | * | 9/2006 | Louveaux | G09G 5/026 345/592 |

(Continued)

OTHER PUBLICATIONS

Adobe Press; Adobe Photoshop 7.0 Classroom in a book; Jun. 25, 2002; ISBN:0-321-11562-7; pp. 1-1,131-137,167,202-203,220-225,229-231,236-252.*

(Continued)

*Primary Examiner* — Phenuel Salomon
(74) *Attorney, Agent, or Firm* — Stoel Rives LLP

(57) ABSTRACT

A graphical user interface (GUI) including an illustration can be rendered. In response to receiving a signal from an input device indicating a location within the illustration, a layer can be defined. When the layer is applied to the illustration, the GUI can be updated such that a portion of the illustration under a filter is displayed as an altered feature. The filter can overlay the indicated location. In some embodiments, another portion of the illustration different from indicated location may not be filtered. Similarly stated, only a portion of the layer can include the filter and/or the layer may not overlay the entire illustration. A signal can be received from the input device indicating a use of the tool on the layer and, in response, the altered feature can be modified.

22 Claims, 10 Drawing Sheets

(56) References Cited

U.S. PATENT DOCUMENTS

| | | | | |
|---|---|---|---|---|
| 7,120,293 | B2* | 10/2006 | Schoelkopf | G06T 11/001 345/418 |
| 8,587,608 | B2* | 11/2013 | Falco, Jr. | G06T 11/00 345/607 |
| 9,070,319 | B1* | 6/2015 | Soni | G09G 5/14 |
| 2003/0184556 | A1* | 10/2003 | Hollis | G06T 15/005 345/582 |
| 2005/0168476 | A1* | 8/2005 | Levene | G06T 15/503 345/582 |
| 2008/0101456 | A1* | 5/2008 | Ridge | H04N 5/262 375/240.01 |
| 2010/0182328 | A1* | 7/2010 | Pirchio | G06T 11/203 345/474 |
| 2013/0055125 | A1* | 2/2013 | Jackson | G06F 3/04845 715/769 |
| 2014/0177963 | A1* | 6/2014 | Wachsmuth | G06T 7/0079 382/190 |

OTHER PUBLICATIONS

Clark, "Lightroom vs. Aperture: Loupe Views Compared," O'Reilly Digital Media [online Feb. 23, 2007], retrieved from the Internet Mar. 21, 2014 at URL: http://www.oreillynet.com/digitalmedia/blog/2007/02/lightroom_vs . . ., 2 pages.

Orwig, "Using the Loupe Tool in Adobe Photoshop CS4," Adobe Press.com [online Mar. 5, 2009], retrieved from the Internet Mar. 21, 2014 at URL: http://www.adobenress.com/articles/article.asp?p=1326504, 2 pages.

Pyy et al., "Virtual Magnifying Glass 3.6," © 1999-2011, retrieved from the Internet Mar. 21, 2014 at URL: http://www.magnifier.sourceforge.net/, 7 pages.

Braun, "Screen Loupe 2000," Softeware Design—Screen Loupe for Windows © 1991-2013, retrieved from the Internet Mar. 21, 2014 at URL: http://www.gregorybraun.com/Loupe.html, 2 pages.

"Use Magnifier to see items on the screen," online manual, retrieved from the Internet Mar. 21, 2014 at URL: http://windows.microsoft.com/en-us/windows-8/use-magnifier-to-see . . ., 3 pages.

"Viewing Images with the Loupe," Aperture 3 User Manual, retrieved from the Internet Mar. 21, 2014 at URL: http://documentation.apple.com/en/aperture/usermanual/index.html, 6 pages.

* cited by examiner

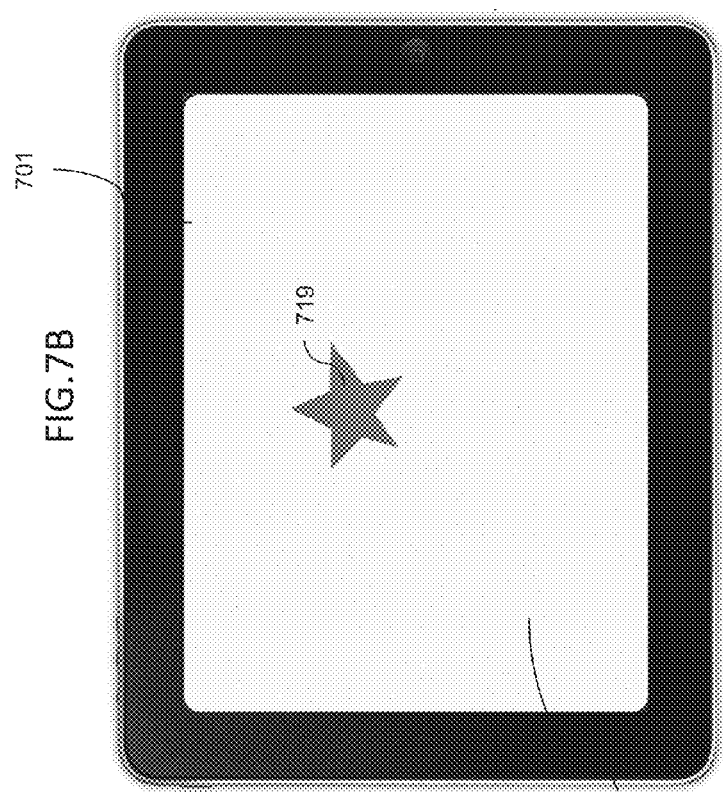
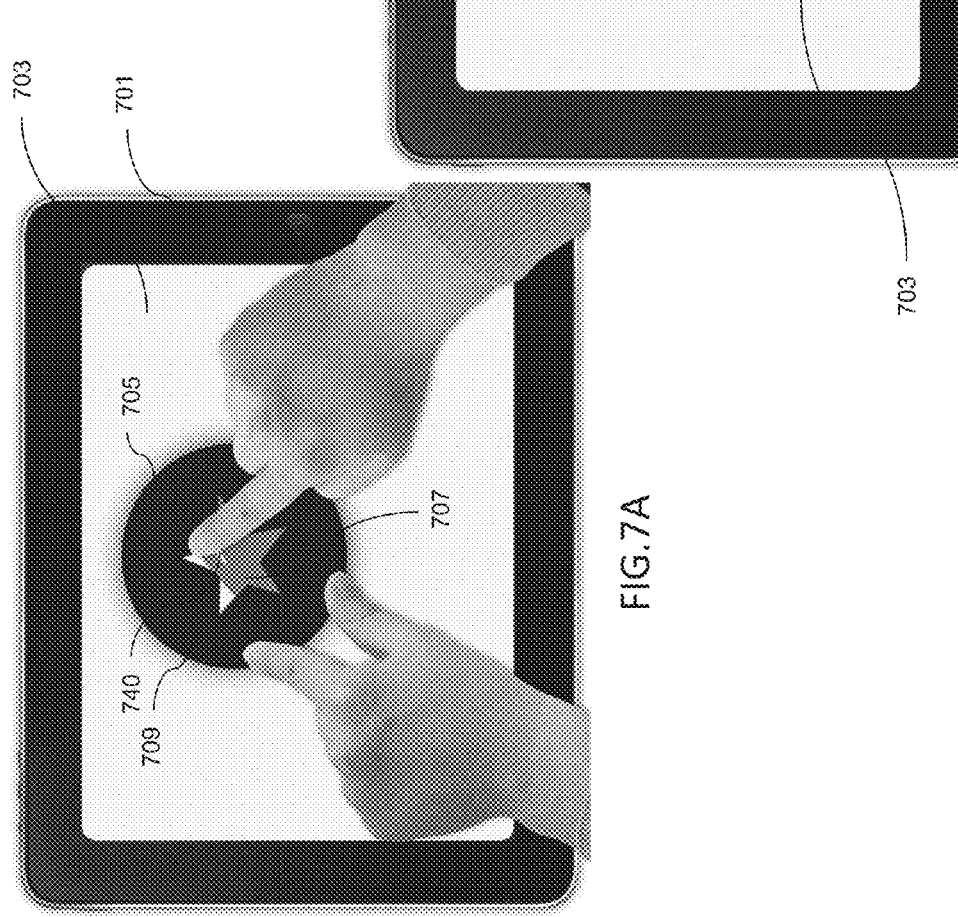

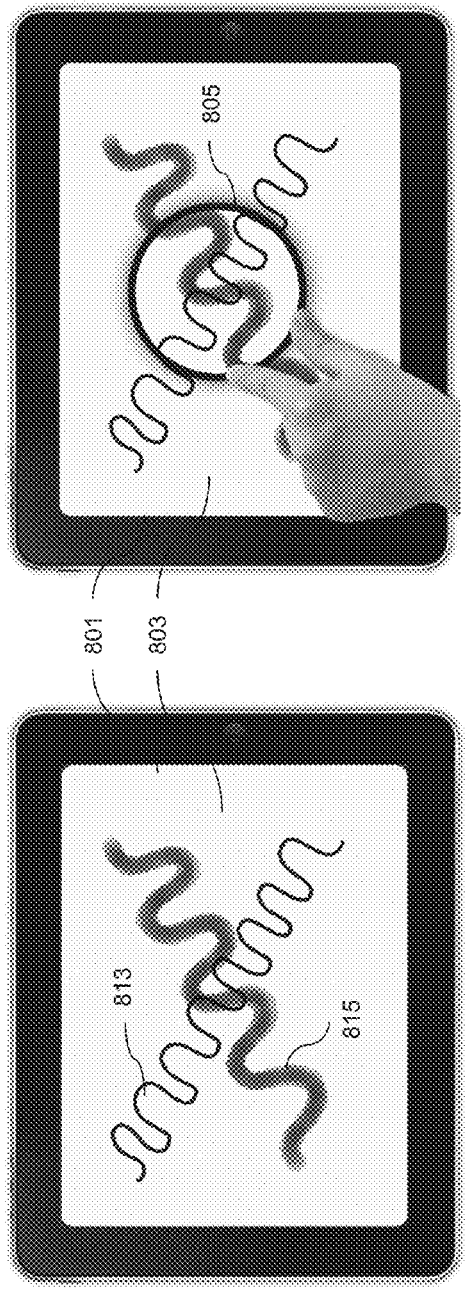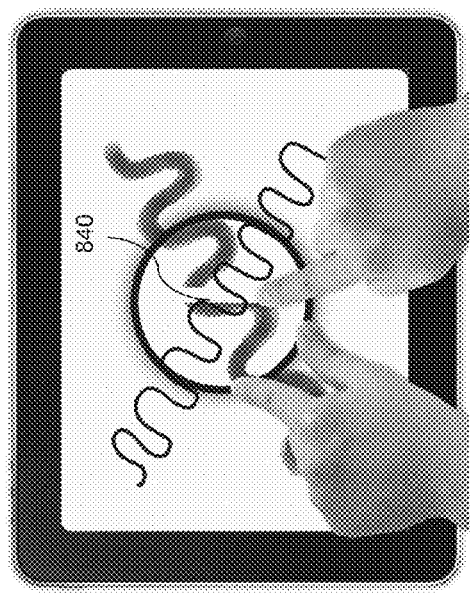

METHODS AND APPARATUS FOR PROVIDING PARTIAL MODIFICATION OF A DIGITAL ILLUSTRATION

CROSS REFERENCE TO RELATED APPLICATION

This application claims priority under 35 U.S.C. §119(e) to U.S. Provisional Patent Application No. 61/820,473, filed May 7, 2013, which is hereby incorporated by reference in its entirety.

BACKGROUND

Some embodiments described herein relate generally to providing partial modification of digital illustrations to users of electronic devices via graphical user interfaces of such electronic devices.

Illustration capabilities and user interfaces for digital illustration management are available via various known software applications developed for user devices. Known digital illustration management services typically provide modification capabilities throughout an illustration canvas. These known systems, however, do not provide partial modification capabilities to the user. For example, a user of known systems cannot select a portion of a digital illustration to be modified, while the rest of the digital illustration remains unchanged. Therefore, a need exists for an approach to overcome the shortcomings of the existing methods by enabling the users to select a portion of a digital illustration and/or image and modify, filter, and/or de-filter the selected portion.

SUMMARY

A graphical user interface (GUI) including an illustration can be rendered. In response to receiving a signal from an input device indicating a location within the illustration, a layer can be defined. When the layer is applied to the illustration, the GUI can be updated such that a portion of the illustration under a filter is displayed as an altered feature. The filter can overlay the indicated location. In some embodiments, another portion of the illustration different from indicated location may not be filtered. Similarly stated, only a portion of the layer can include the filter and/or the layer may not overlay the entire illustration. A signal can be received from the input device indicating a use of the tool on the layer and, in response, the altered feature can be modified.

BRIEF DESCRIPTION OF THE DRAWINGS

FIGS. 7A-7B are an example of partial modification of an illustration canvas, according to an embodiment.

FIGS. 8A-8C are an example of partial modification of an illustration canvas, according to an embodiment.

DETAILED DESCRIPTION

Figure 1:
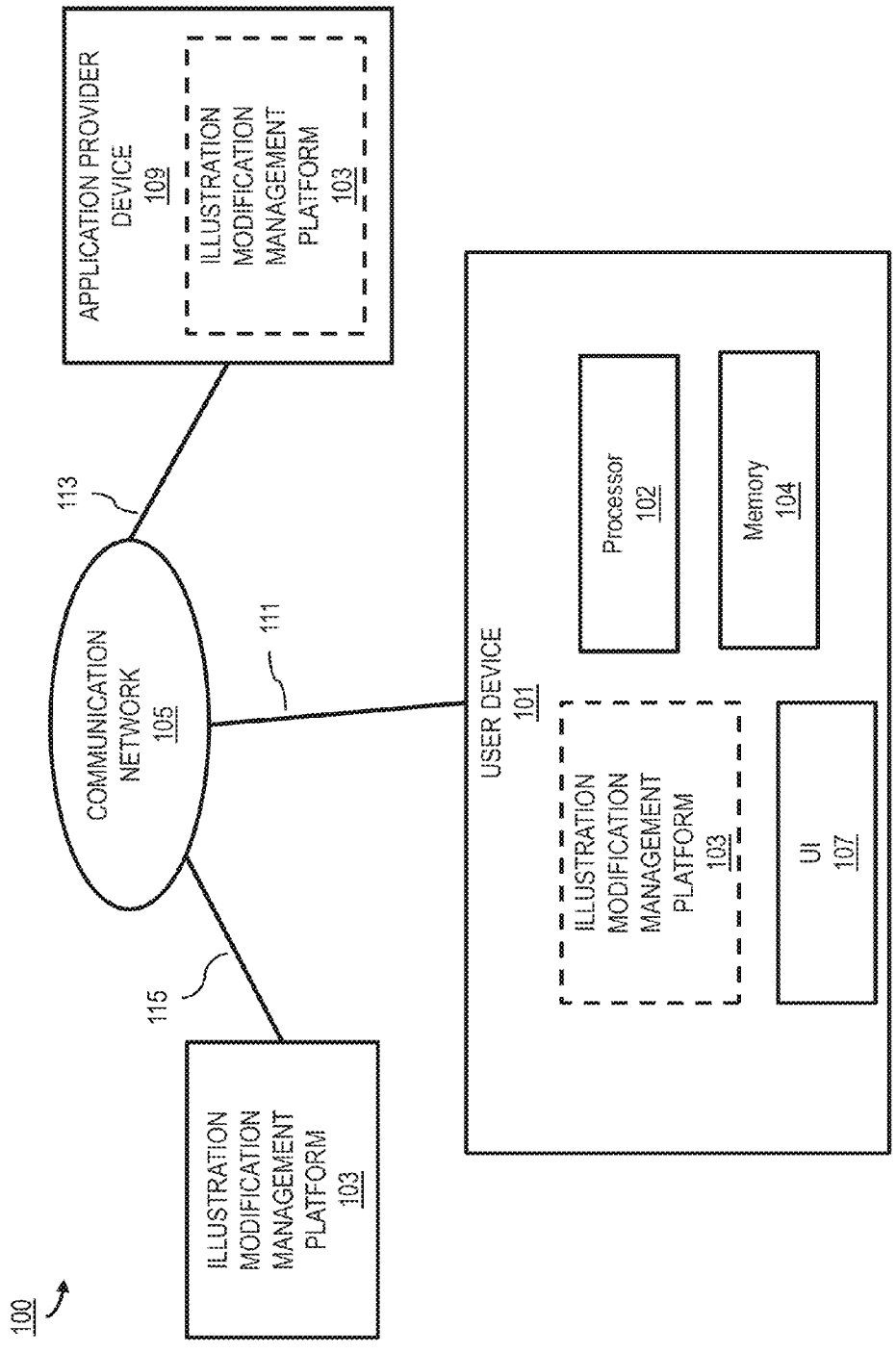
FIG. 1 is a schematic block diagram of a computer system configured to provide functions of partial modification of illustrations, according to an embodiment.

Known digital illustration management systems enable users of user devices to illustrate (e.g., draw, write, color, etc.) such that a user interface of the user device can be used similar to the way a physical canvas is used for illustration. These known digital illustration management systems provide various input methods such as, for example, touch based input on touch screen displays to provide an interactive illustration environment. A user can select various illustration options such as, for example, pen type, color, medium, magnification level, etc., by any suitable gesture or combination of gestures such as, for example, tap, flick, pinch, draw, pinch and spread, etc.

Furthermore, known digital illustration management services typically provide modification capabilities throughout an illustration canvas. These known digital illustration management systems, however, do not provide partial modification capabilities to the user. For example, a user of these known digital illustration management systems cannot select a portion of a digital illustration to be modified, while the rest of the digital illustration remains unchanged. Therefore, a need exists for an approach to overcome the shortcomings of the existing methods by enabling the users to select a portion of a digital illustration and modify, filter, and/or de-filter the selected portion, without modifying, filtering and/or de-filtering the remaining portion of the digital illustration.

Methods and apparatus are described herein to provide partial modification of digital illustrations and/or images. In some embodiments, a method includes receiving a first input from a user device indicating a first location on a digital illustration. The method further includes receiving a second input from the user device indicating a second location on the digital illustration. The method also includes receiving, from the user device, a set of user gesture indicators representing adjustment of the first location and/or the second location. The method further includes selecting and/or defining a layer and/or workspace associated with a portion of the digital illustration that lies between the first location and the second location. The method also includes filtering the portion of the digital illustration. The method also includes receiving a set of user input data indicating modification of the portion of the digital illustration. The method also includes sending a signal to update the digital illustration based, at least in part, on the set of user input data.

In some embodiments, a method includes rendering a graphical user interface (GUI; also referred to herein as a user interface or UI) including an illustration (also referred to herein as a digital illustration). In response to receiving a signal from an input device indicating a location within the illustration, a layer can be defined. The layer can overlay part or all of the illustration. In some embodiments, a portion of the layer includes a filter that alters one or more features of the illustration. Similarly stated, when the layer is applied to the illustration, the GUI can be updated such that at least one feature of the illustration under the filter is displayed as an altered feature. The filter can overlay the indicated location. In some embodiments, another portion of the illustration different from indicated location may not be filtered. Similarly stated, only a portion of the layer can include the filter and/or the layer may not overlay the entire illustration. A signal can be received from the input device indicating a use of the tool on the layer and, in response, the altered feature can be modified.

In some embodiments, a method includes rendering a GUI including an illustration and a tool. In response to receiving a signal from an input device indicating a location within the illustration, a workspace can be rendered within the GUI. The workspace can overlay the indicated location but not another portion of the illustration. Similarly stated, a portion of the illustration mutually exclusive from the indicated location may not be overlain with the workspace. The tool can have a first functionality within the workspace and a second functionality outside the workspace. Similarly stated, the functionality of the tool can be modified within the workspace. A signal indicating a use of the tool within the workspace can be received from the input device. The workspace can be modified based on the first functionality of the tool. In some embodiments, the modification of the workspace can be translated and/or transformed to the illustration such that the modification persists after the removal of the workspace.

In some embodiments, a method includes rendering a GUI including an illustration. In response to receiving a signal from an input device indicating a location within the illustration, a workspace can be rendered. The workspace can overlay the indicated location but not another portion of the illustration. The workspace can be modified in response to receiving a signal from the input device indicating a use of a tool within the workspace. The workspace can have a first region associated with a first portion of the illustration and a second region associated with a second portion of the illustration. For example, the first region of the workspace can overlay the first portion of the illustration and the second region of the workspace can overlay the second portion of the illustration. The workspace can be removed from the GUI. After the workspace is removed from the GUI, the first portion of the illustration can be and/or can remain modified, for example, based on the modification of the first region of the workspace. The second portion of the illustration can be unmodified after removal of the workspace, for example, even if the second region of the workspace was modified.

In some embodiments, a non-transitory processor-readable medium enables a user of a user device to draw a geometrical object (e.g., a circular object) on an illustration canvas, for example, on a display monitor of a user device, using a pinch gesture. The geometrical object can represent a workspace or a layer having a filter. For example, the interior of the circular object can alter a feature of a portion of the illustration canvas that lies within the perimeter of the geometrical object. For example, the circular object can magnify a portion of the illustration. The non-transitory processor-readable medium can define a degree of magnification of the contents as a function of the geometrical object's size (e.g., circular object's diameter).

In some embodiments, the non-transitory processor-readable medium enables the user to perform various drawing activities such as, for example, sketching, coloring, outlining, writing, etc., within the perimeter of the geometrical object. The non-transitory processor-readable medium can apply a corresponding inverse transform to the user strokes, allowing for work at a level of detail previously not possible on the un-magnified contents. Similarly stated, the drawing activities can be reverse-filtered and pass through the filter, and can be applied to the underlying illustration at the scale of the underlying illustration.

In some embodiments, the non-transitory processor-readable medium can provide an interaction capability, gesture set or language for the user of the user device to summon or invoke a geometrical object on the illustration canvas, for example, using pinch, which is a common user interface metaphor for transitioning between levels of detail. The user can manipulate the shape, size and location of the geometrical object using tap, pinch, pan, etc. The interior of the geometrical object can provide a context for the user to interact with the illustration canvas that can be different from the context of the exterior of the geometrical object. For example, the interior of the geometrical object can be magnified, shadowed, have different colors, etc., compared to the exterior of the geometrical object. Distinctions between the interior and the exterior of the geometrical object can provide application of an effect or allow for stenciling. Furthermore, presence of the geometrical object on the illustration canvas can be modal, thus corresponding to the enabling of the effect, and can be summoned and dismissed by the user.

As used herein, "user" can be a person, a module, a device, or an application. In some of the embodiments discussed, a user is referred to as a person using the user device via one or more user interfaces. Additionally/alternatively, a user can be a device, a module of a device, or an application such as, for example, art applications, computer games, simulation applications, etc., that can use the modifications provided and managed by the described methods and apparatus.

As used herein, the singular forms "a," "an" and "the" include plural referents unless the context clearly dictates otherwise. Thus, for example, the term "a "geometrical object" is intended to mean a single geometrical object or a combination of geometrical objects (e.g., multiple geometrical objects defined by a user for modification of different portions of an illustration canvas).

FIG. 1 is a schematic block diagram of a computer network system providing illustration modification management, according to an embodiment. The computer network system 100 includes at least one user device 101, equipped with at least a user interface (UI) 107. The computer network system 100 also includes an illustration modification management platform 103 and at least one application provider device 109, which can be operatively coupled to one or more user devices 101 or other application provider devices via a communication network 105.

The illustration modification management platform 103 or some of its components can be embedded within the user device 101, embedded within an application provider device 109, or be external to the user device 101 and the application provider device 109. In addition, the illustration modification management platform 109 can be operatively coupled to one or more user devices 101 or one or more application provider devices 109 via the communication network 105. Any of the devices or platforms of the computer network system 100 can be equipped with local memory/storage spaces (not shown in FIG. 1). Furthermore, the devices and platforms of the system 100 may have access to centralized or distributed memory/storage spaces (not shown in FIG. 1) through the communication network 105. Thus, FIG. 1 is merely an example illustrating the types of devices and platforms that can be included within a computer network system 100.

Communication network 105 can be any communication network, such as the Internet, configurable to allow the user device 101, the illustration modification management platform 103, and the application provider device 109 to communicate with communication network 105 and/or to each other through communication network 105. Communication network 105 can be any network or combination of networks capable of transmitting information (e.g., data and/or signals) and can include, for example, an intranet, a local area network (LAN), a wide area network (WAN), a virtual network, a telecommunications network, a telephone network, an Ethernet network, a fiber-optic network, any other suitable communication system and/or combination of such networks. The network 105 can be implemented as a wired and/or wireless network.

In some instances, communication network 105 can include multiple networks operatively coupled to one another by, for example, network bridges, routers, switches and/or gateways. For example, the user device 101 can be operatively coupled to a cellular network; the application provider device 109 and/or the illustration modification management platform 103 can be operatively coupled to a fiber-optic network. The cellular network and fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, the user device 101 is operatively coupled to communication network 105 via network connection(s) 111; application provider device 109 is operatively coupled to communication network 105 via network connection(s) 113; and the illustration modification management platform 103 is operatively coupled to communication network 105 via network connection(s) 115. Network connections 111, 113, and 115 can be any appropriate network connection for operatively coupling user device 101, application provider device 109, and the illustration modification management platform 103.

A network connection can be a wireless network connection such as, for example, a wireless fidelity ("Wi-Fi") or wireless local area network ("WLAN") connection, a Wireless Wide Area Network ("WWAN") connection, and/or a cellular connection. A network connection can be a wired connection such as, for example, an Ethernet connection, a Digital Subscription Line ("DSL") connection, a broadband coaxial connection, and/or a fiber-optic connection.

As mentioned above, in some instances, a computer network system 100 can include more than one user device 101, more than one illustration modification management platform 103, and more than one application provider device 109. A user device 101, an illustration modification management platform 103, and/or an application provider device 109, can be operatively coupled to the communication network 105 by heterogeneous network connections. For example, a first user device 101 can be operatively coupled to the communication network 105 by a WWAN network connection, another user device 101 can be operatively coupled to the communication network 105 by a DSL network connection, and an illustration modification management platform 103 can be operatively coupled to the communication network 105 by a fiber-optic network connection. The application provider device 109 can be, for example, a web server configured to provide various applications to electronic devices, such as user device 101.

The user device 101 can be any of a variety of electronic devices that can be operatively coupled to communication network 105. A user device 101 can be a personal computer, a tablet computer, a personal digital assistant (PDA), a cellular telephone, a portable/mobile internet device and/or some other electronic communication device. The user device 101 includes a processor 102, a memory 104, an illustration modification management platform 103, and a user interface 107.

The processor 102 can be, for example, a general purpose processor, a Field Programmable Gate Array (FPGA), an Application Specific Integrated Circuit (ASIC), a Digital Signal Processor (DSP), and/or the like. The processor 102 can be configured to retrieve data from and/or write data to memory, e.g., the memory 104, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. Although not shown, the illustration modification management platform 103 and the application provider device 109 can each include a processor and a memory which can be structurally and/or functionally similar to the processor 102 and the memory 104, respectively.

A web browser (executing on the processor 102) can be configured to access a webpage or website hosted on or accessible via the application provider device 109 over communication network 105. The user device 101 can be configured to support, for example, HTML using JavaScript. For example, the user device 101 can include a web browser, such as, Internet Explorer®, Firefox®, Safari®, Dolphin®, Opera® and Chrome®, etc. An Internet page or website can be accessed by a user of a web browser at a user device 101 by providing the web browser with a reference such as a uniform resource locator (URL), for example, of a webpage. For example, a user of a user device 101 can access an application provider device 109 via a URL designated for the application provider device 109. In some instances, user device 101 can include specialized software for accessing a web server other than a browser, such as, for example, a specialized network-enabled application or program. In some instances, portions of a website accessible via a web server can be located in a local or remote memory space/data store accessible to the web server. A data store can be at least one of a database, a data warehouse, or a file. A user device 101 can also include a display, monitor or user interface (UI) 107, a keyboard, various ports (e.g., a USB port), and other user interface features, such as, for example, digital pens, mice, touch screen controls, audio components, and/or video components (each not shown). A user device 101 can be operatively coupled to communication network 105 via the UI 107 and network connection 111.

Figure 2:
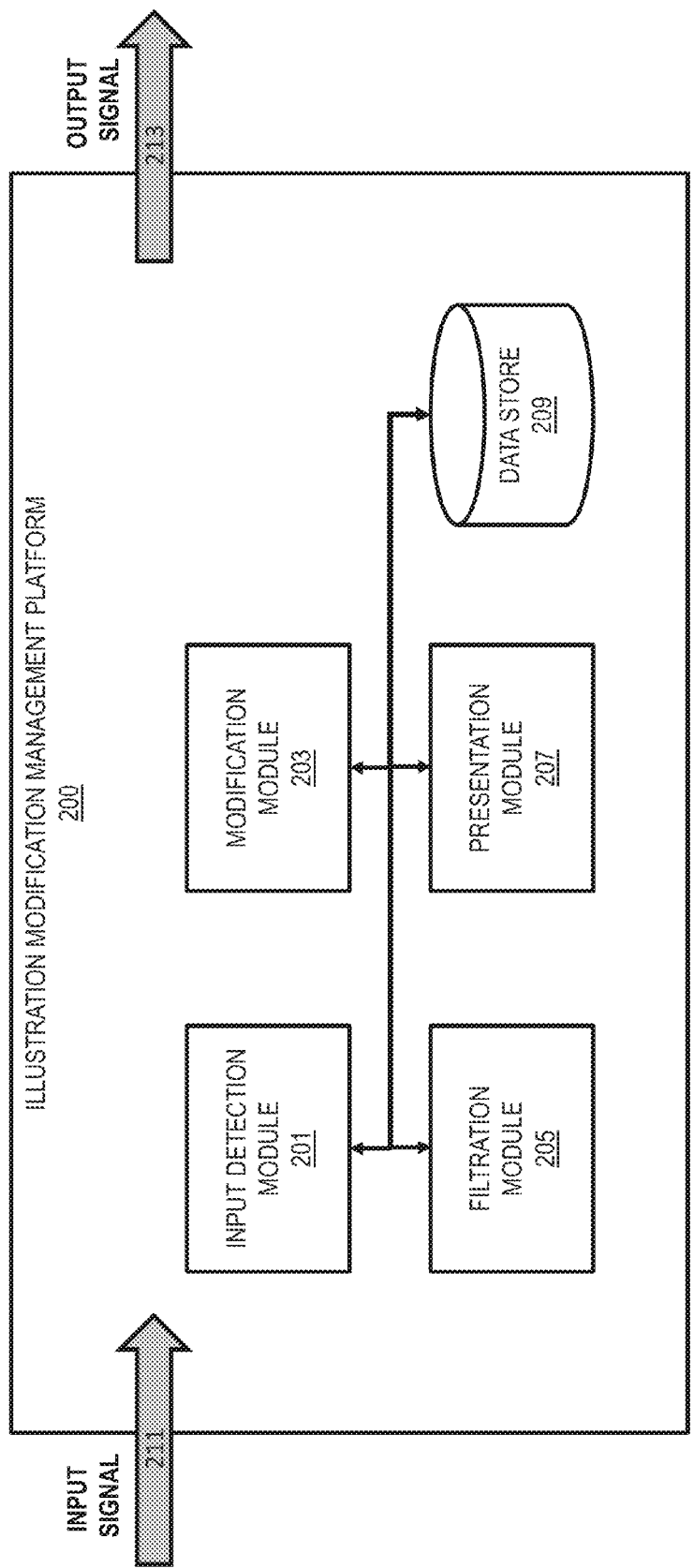
FIG. 2 is a schematic illustration of an illustration modification management platform, according to an embodiment.

FIG. 2 is a schematic illustration of an illustration modification management platform, according to an embodiment. Illustration modification management platform 200 can be similar to the illustration modification management platform 103 of FIG. 1. As shown in FIG. 2, an illustration modification management platform 200 can include an input detection module 201, a modification module 203, a filtration module 205, a presentation module 207, and a data store 209. Furthermore, the illustration modification management platform 200 can communicate with other components of a computer network system (e.g., computer network system 100 of FIG. 1) via input signal 211 and output signal 213, which are received and sent respectively through an input port and an output port (not shown in FIG. 2).

In various instances, the illustration modification management platform 200 and its components may be located anywhere within a communication network system 100 such as that shown in FIG. 1 including, but not limited to, within the user device 101, within the application provider device 109, or in separate locations within the communication network system 100 of FIG. 1.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the illustration modification management platform, as discussed further below.

The illustration modification management platform 200 can provide illustration modification management on a user device 101 via a UI 107. In some instances, the input detection module 201 recognizes an input entered by a user of a user device 101, for example, by recognizing changes in resistance, capacitance, and/or any other suitable interaction between the screen and a finger, a stylus, and/or any other suitable implement. A touch, for example, can be a point of contact between the touch screen of UI 107 and a finger or capacitive stylus (not shown) used by a user of user device 101.

In some instances, the input detection module 201 can enable a user of a user device 101 to draw and/or invoke a shape (e.g., a circle, a triangle, a square, an irregular shape, etc.) on an illustration canvas on UI 107 by recognizing that the user has traced the shape, by recognizing a gesture associated within invoking the shape, such as a pinch gesture, and/or any other suitable movement. A portion of the illustration can be disposed within the interior of the shape. The illustration modification management platform 200 can enable the user to modify some or all of the contents of the shape, for example, as a function of the shape's size (or diameter for a circular shape). The contents of the shape can be modified using, for example, an application provided by the application provider device 109. In some instances, modifying the contents of the shape can cause and/or result in a modification of the contents of the illustration canvas. Additionally or alternatively, data associated with contents of the illustration canvas, the shapes, the modifications, etc., can be saved in data store 209.

In various instances, the input detection module 201 can detect various types of user input such as a gesture (a touch or a combination of touches over time that can enact a unique action), a pinch (a gesture where two touches move towards or away from their geometric centroid (e.g., the center of the area of illustration canvas that lies between the two touches), a pan (a gesture where touches remain at a fixed distance from their centroid but move across the touch screen), etc.

In some instances, the filtration module 205 can alter some or all of the contents of the illustration. For example, in some instances, the input detection module 201 may detect a selection of a location and/or a portion of the illustration canvas. For example, in some instances, the input detection module 201 can detect a user-provided tap or click indicating a location within the illustration. As another example, the input detection module 201 can detect a pinch and spread gesture by a user as selection of a portion of the illustration canvas. In such instances, the filtration module 205 can define a layer and/or workspace. A layer can be analogous to a transparency placed over all or part of the illustration canvas. Thus, alterations made on the layer can appear to be modifications of the illustration, but can be distinguished (e.g., stored in memory separately from the illustration) and/or selectively removed from the illustration. A workspace can be similar to a layer. For example, alterations made within the workspace can appear to be modifications of the illustration, but can be distinguished and/or selectively removed from the illustration. In some instances, tools associated with the UI 107 can have an alternate function within a workspace. In some instances, a workspace can be analogous to a stencil such that alterations made to one portion of the workspace can modify the underlying illustration, while modifications made to another portion of the workspace may not modify the underlying illustration.

The workspace and/or layer can include a filter. The filter can alter the illustration, a portion of the illustration, and/or a feature of the illustration. Similarly stated, the illustration, viewed through the filter, can assume an altered appearance. In some instances, all features of the illustration can be modified by the filter, for example, when the filter is a magnifying filter. In other instances, features of the illustration can be highlighted and/or emphasized by the filter, for example, based on a property of the feature. For example, features of a certain color can be highlighted by the filter while features that are of a different color can be de-emphasized. In this way, features that are highlighted by the filter can be selectively edited. For example, a filter can highlight features of the illustration that are a particular color (e.g., red). When, for example, red features are highlighted, the user can selectively edit those features, for example, erasing red features while leaving non-red features unaltered. This can be useful, for example, for removing flash-induced red-eye from an illustration. In other instances, a filter can highlight a feature based on a source of a feature (e.g., depending on whether the feature was part of an initial illustration or a later modification, the tool that created the feature, and/or so forth), whether the feature is on a background layer, some other layer, and/or so forth. In some instances, the filter can apply an effect to the illustration. For example, the filter can pixilate, pointillate, magnify, distort, blur, sharpen, shade and/or so forth. In some embodiments, the filter can be user-adjustable. For example, the filtration module 205 can be operable to receive a signal from the user indicating an adjustment of a filter, such as a change in magnification level, degree of shading, and/or so forth.

In some embodiments, the filtration module 205 can magnify the contents of the selected portion of the illustration canvas based on input detected by the input detection module 201. For example, in some instances, the input detection module 201 may detect a pinch and spread gesture by a user as a selection of a portion of the illustration canvas. In such instances, the filtration module 205 can magnify the contents of the selected portion of the illustration canvas. The modification module 203 can receive further user input detected by the input detection module 201 to indicate modification of the magnified portion of the illustration canvas. The modification module 203 can apply the modifications indicated by the user input on the contents of the magnified portion of the illustration canvas. For example, the user may want to add text or apply precise drawing on selected portions of the illustration canvas that cannot be applied while the canvas is displayed on UI 107 in its original size. The magnification of the portion of the illustration by the magnification module 205 enables the user to apply fine modifications on the magnified portion of the illustration canvas.

The modification module 203 can be associated with a tool. Similarly stated, the UI 107 can include a representation of a tool, such as a paintbrush, pencil, eraser, etc. When the user selects the tool and applies the tool to the illustration, the modification module 203 can be operable to apply modifications by the user on the contents of the shape, the layer, the workspace, and/or the illustration canvas based on the input detected by the input detection module 201. For example, in some instances, the input detection module 201 can detect a "pinch and spread" gesture by a user as a selection of a portion of the illustration canvas. In such instances, the modification module 203 can receive further input detected by the input detection module 201 after the selection to indicate modification of the selected portion of the illustration canvas. The modification module 203 can apply the modifications indicated by the input on the contents of the selected portion of the illustration canvas, but not on other portions of the illustration canvas (e.g., portions of the illustration canvas outside of the selected portion). For example, the user may want to change color of the contents inside the selected portion of the illustration canvas without affecting color of the contents outside the selected portion.

In some instances, the presentation module 207 provides a presentation of the selections, modifications, magnifications, etc. performed by the input detection module 201, the modification module 203, and/or the filtration module 205 on the UI 107 of the user device 101. In various instances, the input detection module 201, the modification module 203, and the filtration module 205 can store data associated with input, illustration modifications, functions applied to the illustration etc., in data store 209.

Figure 3:
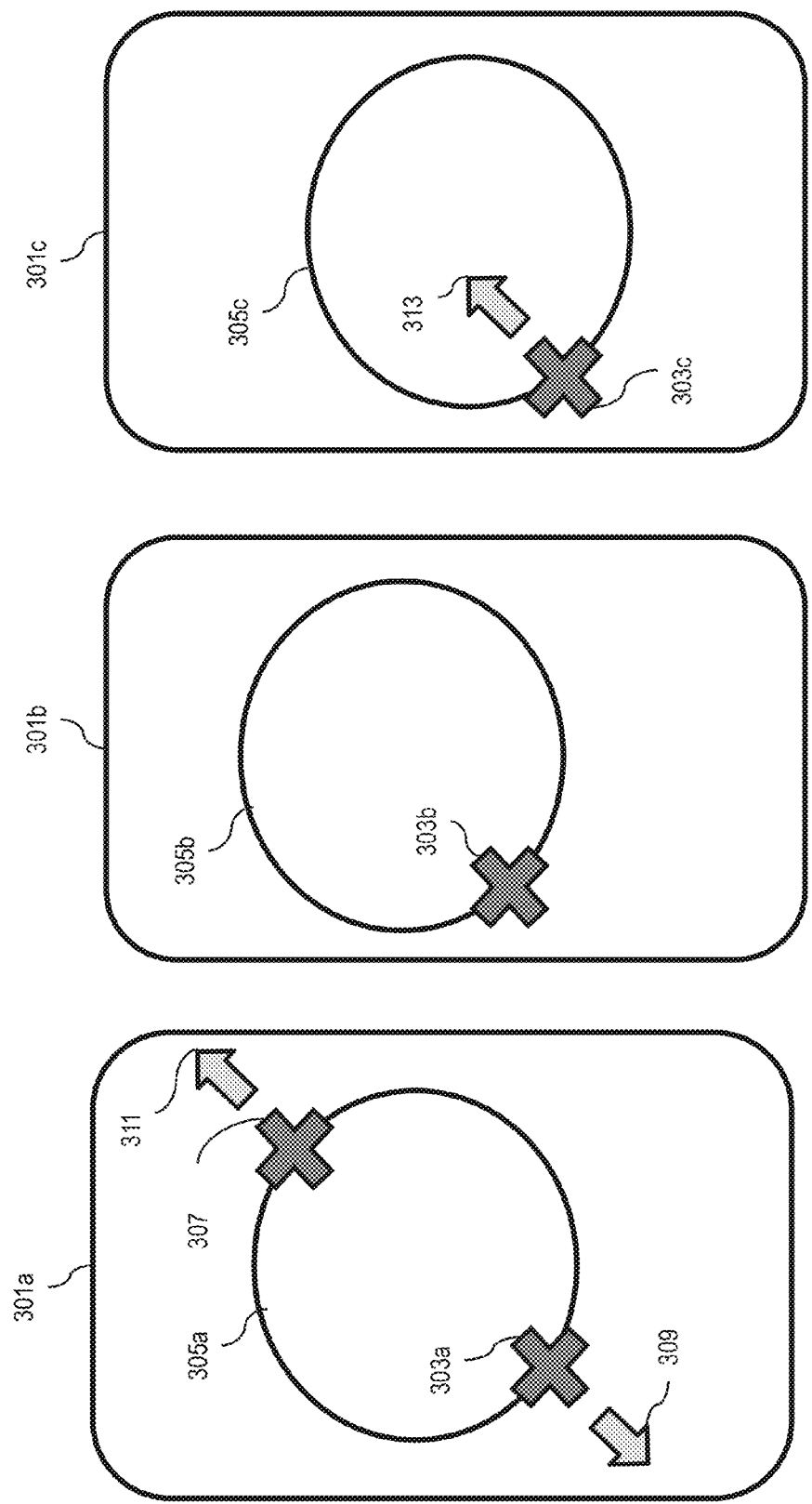
FIG. 3 is an illustration of sample display manipulations provided by the illustration modification management platform, according to an embodiment.

FIG. 3 is an illustration of sample display manipulations provided by the illustration modification management platform 200, according to an embodiment. In some instances, a pinch gesture on the illustration canvas on a UI 301a (similar to the UI 107 of FIG. 1) is detected by the input detection module 201 and the filtration module 205 opens a shape 305a. For example, the pinch gesture can be performed by the user by touching the screen 301a at two locations 303a and 307 and spreading in the directions indicated by arrows 309 and 311.

In some instances, shape 305a (shown as a circle in FIG. 3) or a portion of shape 305a can be a convex or a concave sub-region of the illustration canvas that defines where the user of user device 101 selects to modify the contents of the illustration canvas. For example, the filtration module 205 can assign two canonical control points (e.g., control points that do not affect the shape) on the shape 305a to the two touch locations 303a and 307. When the shape 305a is defined and displayed, it can be animated such that the control points align with the touch locations 303a and 307. In some instances, the shape 305a can remain present and active on the screen even after touches are no longer detected on the screen by the input detection module 201.

In some instances, as the touch locations 303a and 307 are associated with the pinch gesture change, the control points can be moved to follow the user's input (e.g., user touches). In other words, the touch locations 303a and 307 can remain affixed to the rim (the border drawn on the boundary) of shape 305a under changes of scale, translation (e.g., moving), and rotation of shape 305a. This can preserve the physicality of the pinch gesture.

In some instances, size of the shape 305a can be scaled based on a distance between the control points associated with touch locations 303a and 307 in the pinch gesture. Furthermore, translation of the shape can change based on the translation of the centroid of the control points associated with touch locations 303a and 307. Moreover, rotation of the shape 305a can change based on the orientation of the control points associated with touch locations 303a and 307 relative to the original locations when the pinch gesture started.

In some instances, as seen in UI 301b, when the user of user device 101 touches the rim of the shape 305b, for example at location 303b, the input detection module 201 can detect the touch and process the input as a translation (moving) gesture. In such instances, the input module 201 can send a signal to the presentation module 207 to activate a translation function; the presentation module 207 can, for example, modify presentation of shape 305b on UI 301b such that the shape can be moved but not rotated, scaled, etc. The presentation module 207 can provide the user with the capability to continue translating the shape 303b, but not scaling or rotating the shape 303b. For example, as seen in UI 301c, the presentation module 207 allows the user to maintain the single touch location 303c and translate shape 305c in the direction of arrow 313 by panning the control point associated with touch location 303c towards the direction of arrow 313.

In some instances, a pinch gesture can be resumed by adding a second touch (e.g., similar to touch 307) to the existing touch location 303b on shape 305b, resulting in scaling and rotation to be resumed. Similarly, when the input detection module 201 detects two touch locations on UI 301c, the input detection module 201 can send a signal to the modification module 203 to cause the modification module 203 to activate, for example, a scaling function, rotating function, etc.

Figure 4:
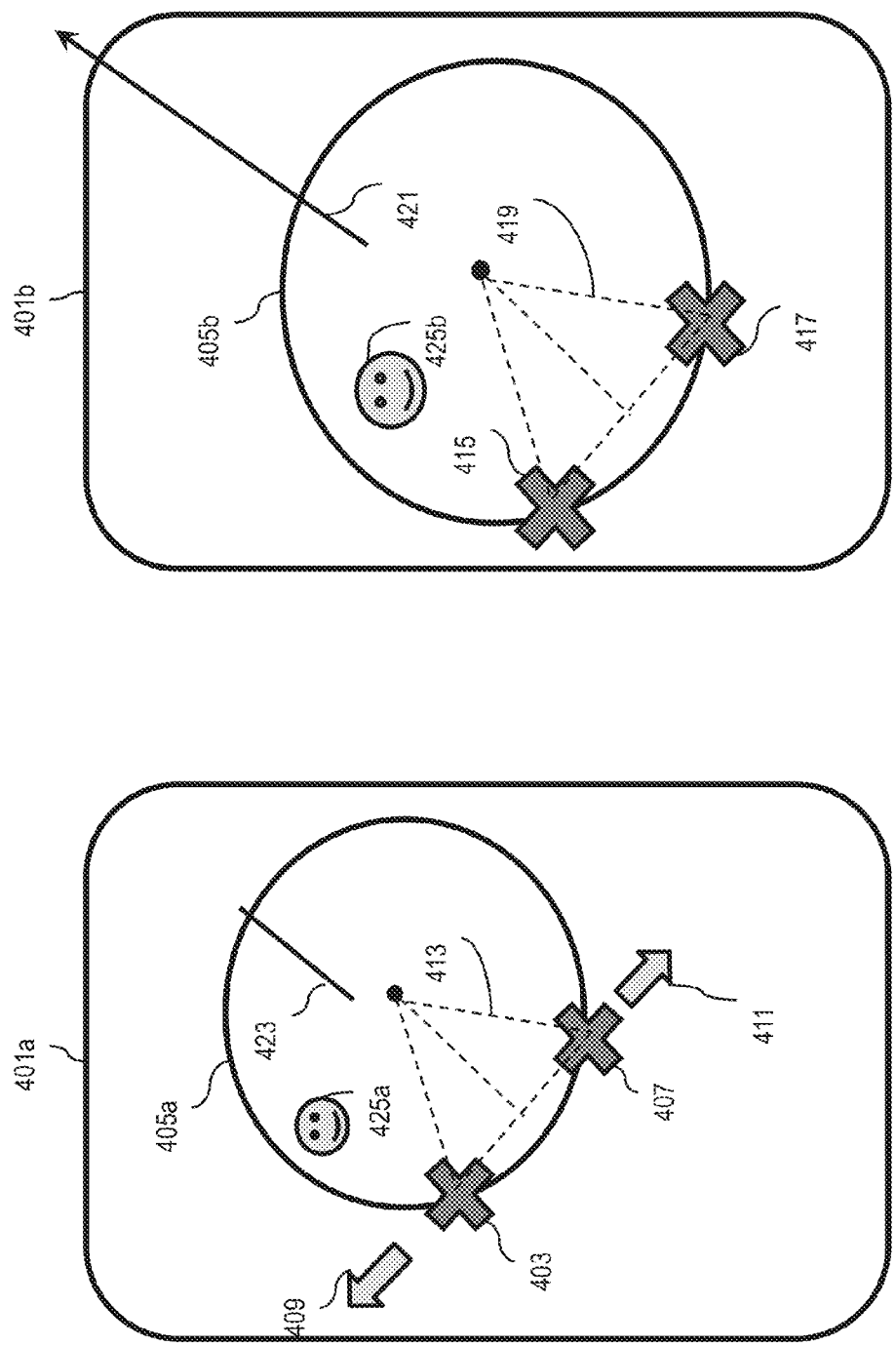
FIG. 4 is an illustration of partial magnification of digital illustrations, according to an embodiment.

FIG. 4 is an illustration of scaling a shape, according to an embodiment. In some instances, the shape 405a can be a layer and/or workspace defined by the filtration module 205. In some instances, the shape 405a (e.g., a circle) can be scaled, translated and/or rotated based on a pinch and spread gesture or other suitable gesture at touch-locations 403 and 407. In such instances, the shape 405a can be transformed relative to the illustration canvas on UI 401a.

The distance between locations 403 and 407 and the radius of circular shape 405a are shown as a triangle 413. The transformation of shape 405a on UI 401a into shape 405b on UI 401b can be a combination of (1) a scale transformation based on a size of the shape 405a (e.g., magnification of triangle 415 shown in shape 405b as triangle 419); (2) a translation transformation based on a position of the shape 405a (e.g., movement from a location within UI 401a to a location within UI 401b); and/or (3) a rotation transformation based on a rotation of the shape 405a (rotation of shape 405a is not shown in FIG. 4, because shape 405a is circular; a rotation can be visible in non-circular shapes, not shown).

For example, when the control points associated with touch locations 403 and 407 on shape 405a are spread by a user, as shown by arrows 409 and 411, the size of shape 405a increases. In some instances, the input detection module 201 detects spreading of the two touch locations on UI 401b, and the input detection module 201 can send a signal to the filtration module 205. The filtration module 205 can apply a magnification filter. For example, the filtration module 205 can define a layer and/or workspace including a filter operable to cause a portion of the illustration underlying the filter to be magnified. The presentation module 207 can, for example, cause the magnified shape 405a to be rendered and/or otherwise displayed via the UI 401*b*. In this example, triangle 413 is magnified with the same scale that the size of shape 405*b* increases with regards to shape 405*a*. The triangle 419 on UI 401*b* is a magnification of triangle 413 of UI 401*a*.

In some instances, an action performed by a user on a shape 405*b* that affects the illustration canvas on UI 401*b* can pass through a corresponding inverse transform. For example, if shape 405*b* is a magnification of a small portion of the illustration canvas of UI 401*a* with a magnification ratio f, then a drawing 425*b* by user input on the illustration canvas and within the shape 403*b* can cause the modifications associated with that user input to be applied to drawing 425*a* of the illustration canvas on UI 401*a* with an inverse ratio of f (1/f). Similarly stated, a modification on a layer and/or workspace can be translated to the underlying illustration.

In some instances, other transformations such as, for example, a magnification, a rotation, and/or a translation of a shape 405*a* into a shape 405*b* on an illustration canvas can be performed using a magnification ratio f, a rotation ratio r, or a translation ratio t, respectively. In such instances, an inverse transformation of the magnification can be performed on shape 405*b* with an inverse magnification ratio (1/f). Similarly, the inverse transformation of the rotation can be performed with an inverse ratio (1/r) and the inverse transformation of the translation can be performed with inverse ratio (1/t).

In various instances, the user can perform actions (e.g., modifications, drawing, writing, etc.) inside a shape 405*b* in addition to or instead of manipulating the shape 405*b* and/or while the shape 405*b* is pinned (e.g., the shape remains present and active on the screen when no user input on the screen occurs). The user actions can modify the configuration of the shape 405*b* or transform of shape 405*b* with respect to the illustration canvas on UI 401*b*. In addition or alternatively, user actions can modify the contents of the shape 405*b*. For example, if the user applies a stroke 421 to draw a line while the stroke exceeds the edge of shape 405*b*, the illustration modification management platform 200 can adjust the length of the line based on the magnification level of shape 405*b* such that the resulting line 423 is bound by the edge of shape 405*a*. In some instances, the result of an action (e.g., line 423) can be entirely limited to the area of the shape 405*a* (e.g., clipped to the shape 405*a*). In other instances, the result can be allowed to slightly exceed the bounds of the shape 405*a*.

In some instances, a tool associated with the modification module 203 can have different functionalities inside the shape 405*a* and/or 405*b* and outside the shape 405*a* and/or 405*b*. For example, if the tool is applied to the illustration outside the shape, without the shape 405*a* and/or 405*b* being invoked, and/or after the shape 405*a* and/or 405*b* is dismissed, the tool can have a first functionality; while inside the shape 405*a* and/or 405*b* the tool can have a second functionality.

For example, outside the shape 405*a* and/or 405*b*, the tool can be operable to make free-form illustrations (e.g., the tool can be a pencil, brush, etc.). Inside the shape 405*a* and/or 405*b*, however, the tool can be operable to make straight lines, shapes snapped to a grid, etc. For another example, the tool can be operable to make lines or free-form shapes outside the shape 405*a* and/or 405*b*; inside the shape 405*a* and/or 405*b*, lines and/or marks can be measured and the measurement displayed. For another example, outside the shape 405*a* and/or 405*b*, a watercolor tool can be operable to make marks that simulate the use of a paintbrush with watercolor paint; inside the shape 405*a* and/or 405*b*, the watercolor tool can simulate being used with a clear water reservoir to dilute the marks (e.g., reduce the intensity of the marks) and/or the underlying illustration. For yet another example, a pencil tool can have a first marking thickness outside the shape 405*a* and/or 405*b* and a second (e.g., thicker or thinner) thickness inside the shape 405*a* and/or 405*b*. Similarly, a paint brush tool could simulate one size, shape, and/or type of brush outside the shape 405*a* and/or 405*b* and another size, shape, and/or type of brush inside the shape 405*a* and/or 405*b*. For a further example, inside the shape 405*a* and/or 405*b*, shapes drawn with a tool (e.g., a free-form drawing tool) can be interpreted as letterforms and displayed as text (e.g., inside the shape 405*a* and/or 405*b*, shapes resembling letterforms can be rendered as text). For another example, inside the shape 405*a* and/or 405*b* an effect, such as a pixelate, pointillize, distort, shade etc. can be applied to a marking as the marking is applied. Alternatively, such an effect can be temporarily applied when the mark is made inside the shape 405*a* and/or 405*b* and can revert, either automatically or in response to a user input, to a mark without the effect.

Figure 5:
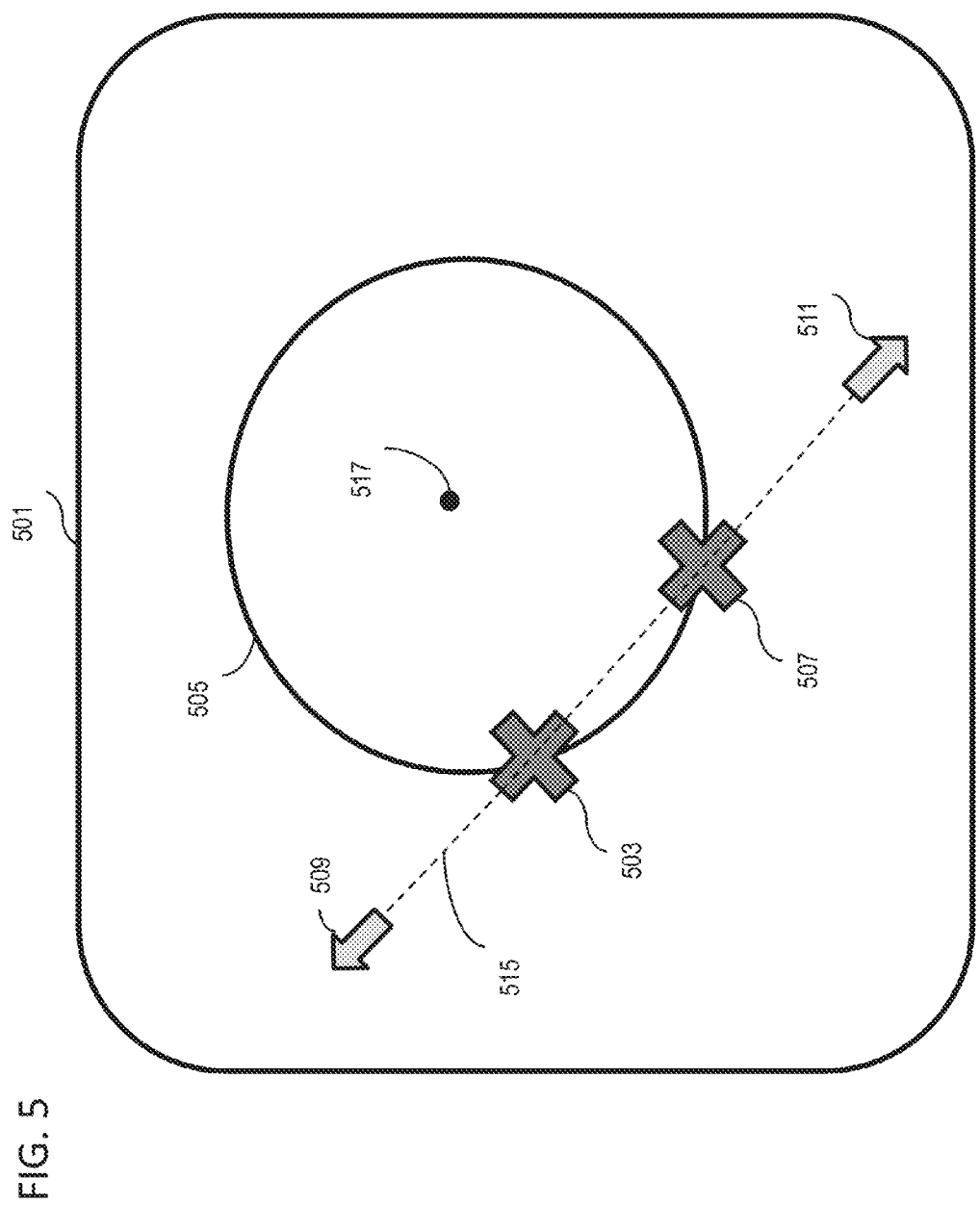
FIG. 5 is an illustration of resizing a portion of a digital illustration, according to an embodiment.

FIG. 5 is an illustration of resizing a portion of an illustration, according to an embodiment. For example, a user can indicate a location on a UI 501. For example, the user can "tap" or click the point 517, trace the perimeter of the shape 505, and/or tap or click the points 503 and 507. Such an indication can be detected by the input detection module 201. In response, the shape 505, can be invoked and/or rendered, for example, by the filtration module 205. The shape 505 can be a layer or a workspace overlaid on a background illustration. Point 517 is the centroid 517 of the shape 505, while points 503 and 507 can be control points 503, 507. A user input associated with the control points 503, 507 and/or the centroid 517, can be operable to modify the size, shape, and/or location of the shape 505.

In some instances, for example, in an instance in which the user indicates a location by touching the control points 503 and 507, releasing the control points 503 and 507 can have various possible effects. For example, if the user is pinching on touch locations 503 and 507 and the pinch ends with a velocity towards the centroid 517 exceeding a pre-defined threshold velocity, then the shape 505 can be dismissed using an animation (e.g., the shape disappears from the UI 501, the shape shrinks into a dot and then disappears from the UI 501, etc.).

In some instances, if the user pinches on control points 503 and 507 and, if the pinch ends with a velocity towards the centroid 517 not exceeding the pre-defined threshold velocity, then the shape 505 can be pinned. For example, enlargement of shape 505 stops at a point where the size of the shape 505 does not increase, even when the pinching gesture continues along line 515 in the direction of arrows 509 and 511. In other instances, if the user is panning the shape with a single touch and release (e.g., using one control point 503, 507 or the centroid 517), the shape 505 can be pinned.

In some instances, if the user initiates a pinch whose centroid 517 is contained within the shape 505, the illustration modification management platform 200 can identify the two points on shape 505 that are closest to the touch locations 503 and 507 in the pinch, given the current transformation of shape 505. The illustration modification management platform 200 can use those points as the control points 503, 507 for further transformations of the shape 505. The transformation of shape 505 can be animated such that the control points align with the touch locations 503 and 507. In the case of a circular shape 505, the alignment can be performed by intersecting the ray passing through the center of the circle to the touch point, with the circle itself. In some instances, initiating a single touch that intersects or is near (e.g., within 5%, 10%, 15% or any other suitable distance of a radius or other characteristic length of the shape 505) the perimeter of the shape 505 and/or initiating a single touch at or near (e.g., within 5%, 10%, 15% or any other suitable distance of a radius or other characteristic length of the shape 505) the centroid 517 can initiate a pan of shape 505.

In some instances, when manipulating the shape 505 with either a single touch location (e.g., 517, 503, 507, and/or any other suitable touch location) or a pinch gesture (e.g., using touch locations 503 and 507), if a gesture (e.g., a stroke) leaves the edge of the screen of UI 501 with sufficient velocity, and a new touch enters UI 501 at a location and with a velocity where the new touch appears to be a continuation of the original stroke, then the manipulation of shape 505 that was in progress prior to the first stroke leaving the screen edge, can be continued as if the stroke never left the screen edge. This enables the user to remain on track while modifying an illustration and the physicality of manipulation of the illustration is preserved.

In some instances, if the user is dragging a shape 505 around on UI 501, for example, on path 515, with a single touch and that touch leaves the screen and/or moves onto the screen edge, and a subsequent touch is made, for example on or near (e.g., within 2% of the width of the UI 501, within 5% of the width of the UI 501, or any other suitable distance) the path 515, the illustration modification management platform 200 can end a manipulating touch and then start a new manipulation touch. The illustration modification management platform 200 can define a connection between the two touches and recognize that the drag manipulation that was in progress is continued or a new stroke with a new touch is started.

In some instances, size of shape 505 can be limited to a maximum size. In such instances, the shape 505 is limited in size to not occupy the entire illustration canvas. In such instances, before shape 505 exceeds the maximum size, the touch locations 503 and 507 of the pinch gesture correspond precisely to the control points on the shape 505. When the maximum size of the shape 505 is exceeded, the control points can be positioned along the line 515 connecting the touch locations 503 and 507, but spaced such that the size of the shape 505 equals and maintains the maximum size. This allows rotation and translation manipulation to proceed as normal while scale is limited. The control points can be positioned on the line 515 such that one or both control points corresponds to a touch location (e.g., 503 and/or 507) or they can be centered with respect to the centroid of the touches.

In some instances, a shape 505 can contain or represent one or more images (not shown in FIG. 5). Similarly stated, when the shape 505 is invoked, one or more images can be automatically rendered within the shape 505. For example, a photograph, a vector-based image (mathematically drawn), an image defined based on user drawings, an image defined by a user, etc., can be associated with a shape 505. The image can be stored in data store 209. The image associated with the shape can be partially- or semi-transparent (e.g., with a pre-defined or user-defined degree of transparency less than completely transparent) such that, for example, when the user translates, rotates, or scales shape 505, the image can receive the same transformation as shape 505. In such instances, the illustration modification management platform 200 can enable the user to, for example, trace at least a portion of the image associated with shape 505 onto the illustration canvas on UI 501 by drawing over the image lines of the image, similar to what the user can do with tracing paper on a physical illustration canvas.

In some instances, the shape 505 can be operable to define and/or apply a stamp and/or tiling. For example, after invoking the shape 505, the user can indicate that the image associated with the shape 505 should be applied to the illustration canvas. The modification module 203 can be operable to apply the image a single time in the location of the shape 505. In addition or alternatively, the modification module 203 can be operable to apply multiple copies of the image associated with the shape 505, for example as a background pattern for the illustration. In some instances, the image associated with the shape 505 can be a portion of the illustration underlying the shape 505. Similarly stated, in some instances, invoking the shape 505 can apply a copy functionality such that the portion of the illustration underlying the shape can be stamped and/or tiled in another location within the UI 501.

In some instances, the shape 505 can function similar to a stencil. In such an embodiment, the shape 505 can have a first portion, similar to the cut-out or negative portion of a stencil, and a second portion, similar to the positive space of the stencil. Similarly stated, the shape 505 can be or include a workspace and/or a layer overlaying an illustration. In some instances, the positive space of the stencil can have a greater opacity than the negative space of the stencil. In addition or alternatively, the border between the first portion and the second portion of the stencil can be indicated, for example by a line, by a change in color, or any other suitable means. The user can select a tool (e.g., a brush, a pencil, a fill tool, etc.) and mark in the shape 505. In response, the modification module 203 can modify the shape 505. Furthermore, when the user marks in the shape 505, the modification module 203 can modify the underlying illustration based on marks made on the first or cut-out portion can, while marks made on the second or positive portion of the shape 505 may not result in the underlying illustration being modified. In this way, when the shape 505 is removed or dismissed, marks made on the second or positive portion of the shape 505 can be removed while marks made on the first or negative portion of the shape 505 can be persist on the underlying illustration.

In some such instances, the modification module 2013 can be operable to apply an effect to a marking made in the negative space of a stencil based on the proximity of the marking to the border between the first portion of the stencil and the second portion of the stencil. For example, a marking made in the negative space adjacent to a border between the first portion and the second portion of the stencil can be darker and/or have a greater opacity than a marking made in the middle of a negative space. This effect can simulate ink or paint pooling at the edge of a physical stencil. For example, markings made within about 1%, within about 2%, or within about 5% (or any other suitable percentage) of a characteristic length (e.g., a radius, a length, a width, etc.) of border between the negative space and the positive space can be darker than markings made further away from the border.

Figure 6A:
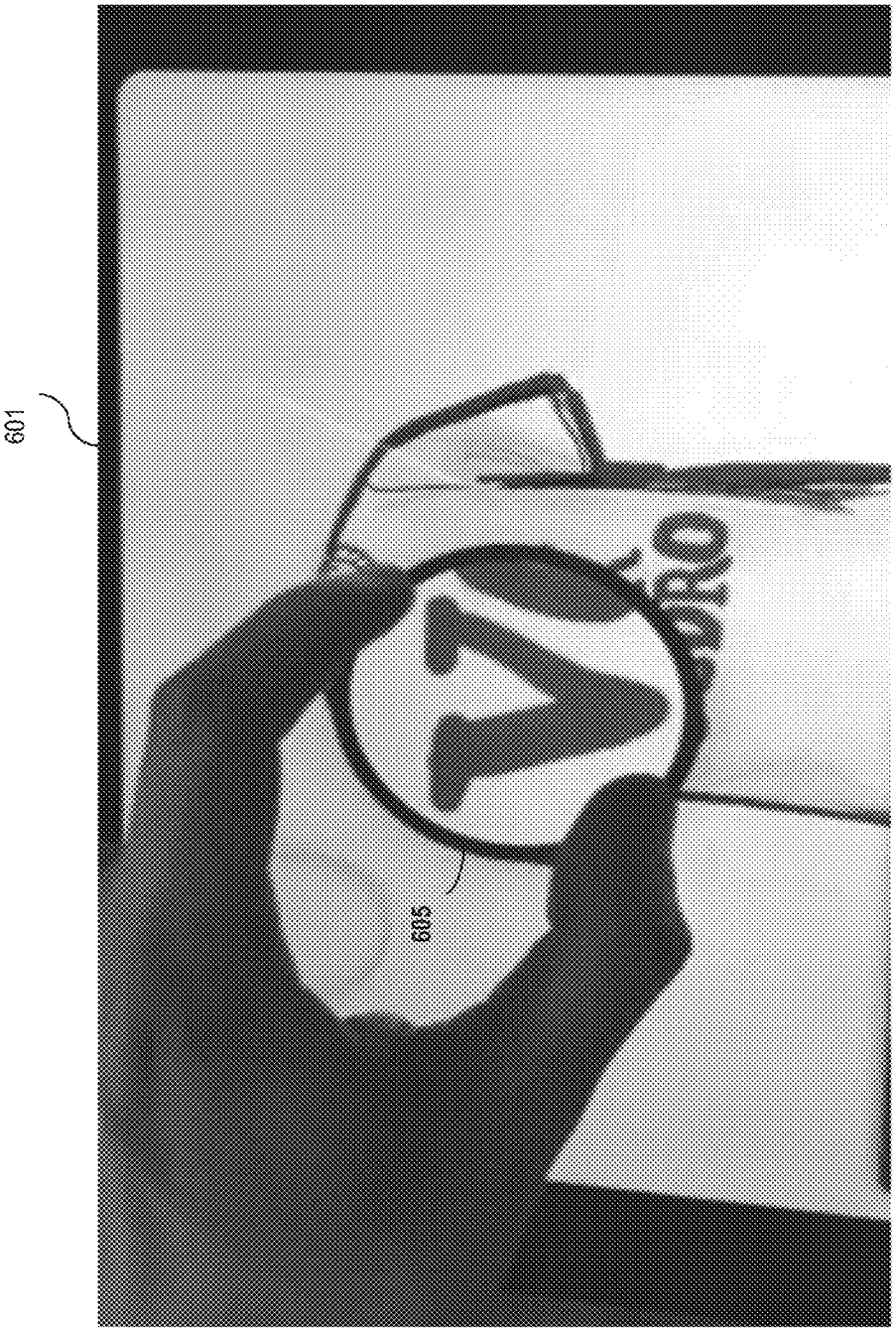
FIGS. 6A-6C are an example of sample partial magnification and modification of an illustration canvas, according to an embodiment.
Figure 6C:
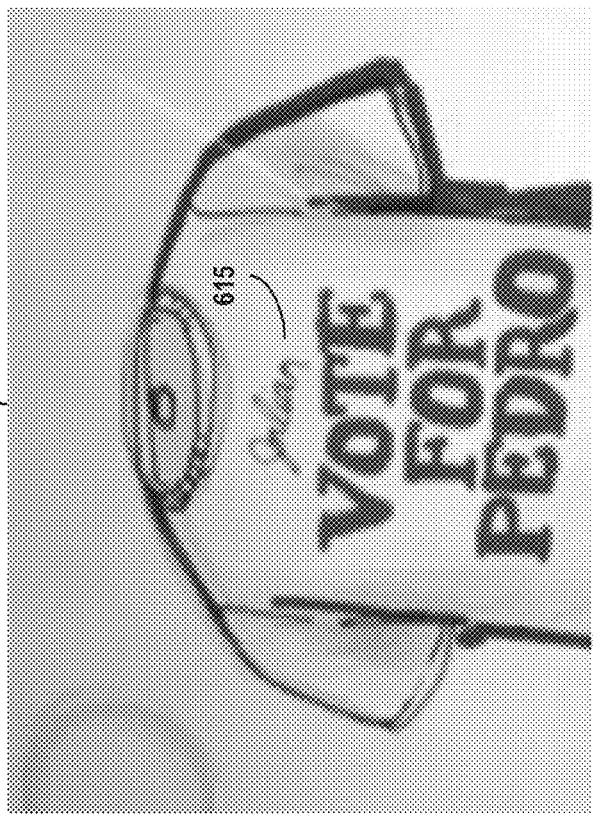
Figure 6B:
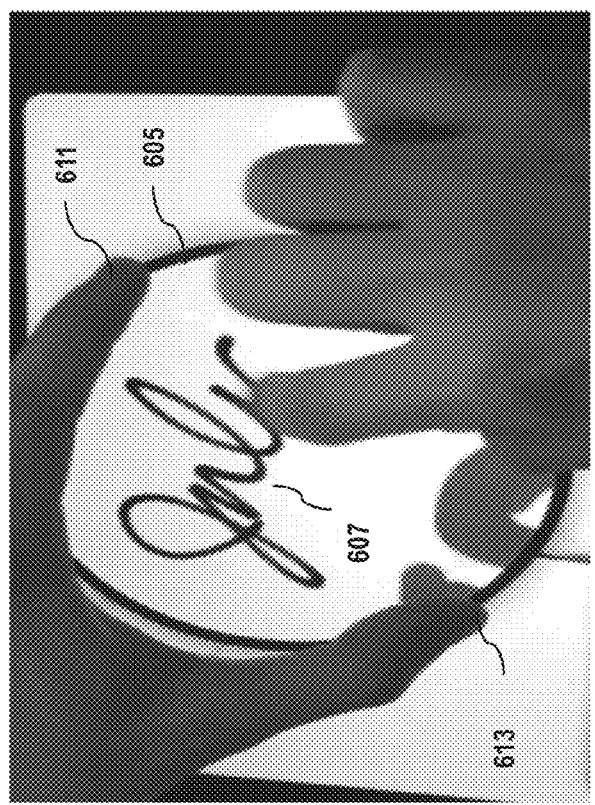

FIGS. 6A-6B are examples of sample partial magnification and modification of an illustration canvas, according to an embodiment. In some instances, the shape 605 is a circular shape. The shape 605 magnifies the content of an area of the screen 601 at or near the center of the shape 605.

In some instances, the transformation of the content is adjusted such that as the shape 605 approaches the edges of the canvas 601, the shape 605 is biased towards showing contents that are closer to the edge. In some other instances, various linear and/or non-linear transformations can be applied to the content to define various visual effects on the edges or other locations on the canvas. For example, the filtration module 203 can define a fisheye lens effect, a panoramic effect, etc. In some instances, the transformation of the content can be conditional such that, for example, specified content objects, specified content shapes, specified content colors, etc. are associated with pre-defined transformations. For example, blue objects in the content can be magnified without magnifying objects of other colors. In addition or alternatively, objects that are not, for example, blue may be filtered from the shape 605. The conditions can be defined by the user via user device 101, defined by application provider devices 109, etc., and stored in data store 209.

In some instances, user actions (e.g., drawing) in the interior of the shape 605 can be performed similar to drawing on the illustration canvas 601. The representation of displayed inks (e.g., a pen type, a pen color, etc.), however, can be adjusted such that they behave properly at the given scale of shape 605. Similarly stated, a tool can have an altered functionality inside the shape 605. For example, as seen in FIG. 6B, the user can write a word 607 inside the shape 605 with one hand while holding two touch locations 611 and 613 on the shape 605, for example, by two fingers of the other hand. In this example, the size of writing font is adjusted to the size of and magnification within shape 605. After the user input (e.g., writing) is completed, the user can release or dismiss the shape 605 (for example by pinching towards the center of shape 605) and the scale of writing 607 is adjusted to the normal size of the illustration canvas 609, shown as writing 615 as shown, for example, in FIG. 6C.

In some instances, user input (e.g., drawing) outside the shape 605 of FIG. 6A can cause the shape 605 to be dismissed and the drawing to be normally applied on the illustration canvas. For example, tapping outside the shape 605 can cause the shape 605 to be dismissed, but no new drawing object is added to the illustration canvas. In some instances, a stroke that begins inside the shape 605 can exceed the bounds of the shape. The illustration modification management platform 200 can be operable to clip the stroke if the stroke extends too far (e.g., beyond than a pre-defined threshold of the shape 605), at, for example, the edge of shape 605.

In some instances, the shape 605 can be used as a ruler or a guide. For example, the shape 605 can be rectangular. In such instances, the visual affordance for the ruler shape 605 can be decorated with regular tick marks and a drawing performed using the ruler shape can be limited to the exterior of the ruler shape 605.

FIGS. 7A and 7B are examples of a UI 701 having an illustration canvas 703, according to an embodiment. As shown in FIG. 7A, a workspace 705 has been invoked (e.g., in response to a user input detected by the input detection module 210, the workspace 705 can be defined and/or rendered by the filtration module 105). The workspace 705 can be functionally analogous to a stencil. Similarly stated, the workspace 705 has a negative or cut-out portion 707 and a positive portion 709. As shown, the positive portion 709 is opaque, while the cut-out portion 707 is transparent. The user can mark 740 within the workspace, for example using a swipe gesture. The user's gesture can be detected by the input detection module 201 and, in response, the modification module 203 can modify the workspace 705, which can be reflected in the UI 701. In this embodiment, modifications to the positive portion 709 of the workspace 705 are not visible because the positive portion 709 is black and opaque. In other embodiments, however, the positive portion 709 may be partially transparent, a lighter shade than the modification, and/or modifications to the positive portion 709 may be reflected in the UI 701.

Modifications to the cut-out portion 707 of the workspace 705 can pass through or be translated to the underlying illustration canvas 703 (e.g., by the modification module 103). Similarly stated, modifications applied to the cut-out portion 707 of the workspace 705 can cause the modification module 103 to modify the illustration canvas 703, while modifications made to the positive portion 709 of the workspace 705 may not be translated or applied to the illustration canvas 703. For example, as shown in FIG. 7B, after the workspace 705 is dismissed, modifications associated with the cut-out portion 707 can persist on the illustration canvas 701, leaving a stenciled feature 719, while modifications made to the positive portion can be removed from the UI 701 when the workspace 705 is removed.

FIGS. 8A-8C are examples of a UI 801 having an illustration canvas 803, according to an embodiment. The illustration canvas 803 includes two features, a pen line 813 and a watercolor line 815. The illustration modification management platform 200 (e.g., the filtration module 205 and/or the modification module 203) can be operable to distinguish between the pen line 813 and the watercolor line 815. For example, metadata associated with the pen line 813 and/or the watercolor line 815 can be stored, for example, in the data store 209. Metadata can indicate that the pen line 813 has a different source than the source of the watercolor line 815. For example, metadata can indicate that the pen line 813 was drawn using a pen tool while the watercolor line 815 was drawn using a watercolor tool; the pen line 813 was an original image while the watercolor line 815 was an after-added modification (or vice versa); the pen line 813 resides on one layer, while the watercolor line 815 resides on another layer; and/or so forth. In addition or alternatively, features associated with the pen line 813 and/or the watercolor line 815 can distinguish the water color line 815 from the pen line 813. For example, the watercolor line 815 and the pen line 813 can be different colors, have different textures, opacities, and/or differences in any other suitable features.

FIG. 8B illustrate a user invoking a shape onto the UI 801. For example, the user can make a touch, pinch, or any other suitable gesture, which can be recognized the input detection module 201 as a selection or indication of a portion of the illustration canvas 803. In response, the filtration module 205 can define the shape, which can be rendered on the UI 801 and overlay the portion of the illustration canvas 803 indicated by the user. FIG. 8C illustrates the user using an erasure tool 840 within the shape 805 to selectively erase the watercolor line 815 and not the pen line 813. Although both the watercolor line 815 and the pen line 813 are visible within the shape, in other embodiments, features that are not modifiable within the shape 805 may not be shown or may have their appearance altered (e.g., by the filtration module 805) such that the user can more readily identify which features are modifiable. For example, features that are not modifiable within the shape 805 may be shown in grayscale, may have their opacity reduced, etc.

The erasure tool 840 and the shape 805 can be collectively configured to erase the watercolor line 815 without erasing the pen line 813. For example, the shape 805 can include a filter to highlight the watercolor line 815 and/or selectively mask the pen line 813. The erasure tool 840 can be operable to erase all features to which it is applied outside the shape, leaving a blank illustration canvas 803. Inside the shape 805, however, the erasure tool 840 can be operable to only erase the watercolor line 815 and/or not erase the ink line 813. Similarly stated, the modification module 203, upon receiving an indication of use of the erasure tool within the workspace 805, can modify the watercolor line 815, but not the ink line 813, even if the user applies the erasure tool 840 to the ink line 813 inside the shape 805.

Figure 9:
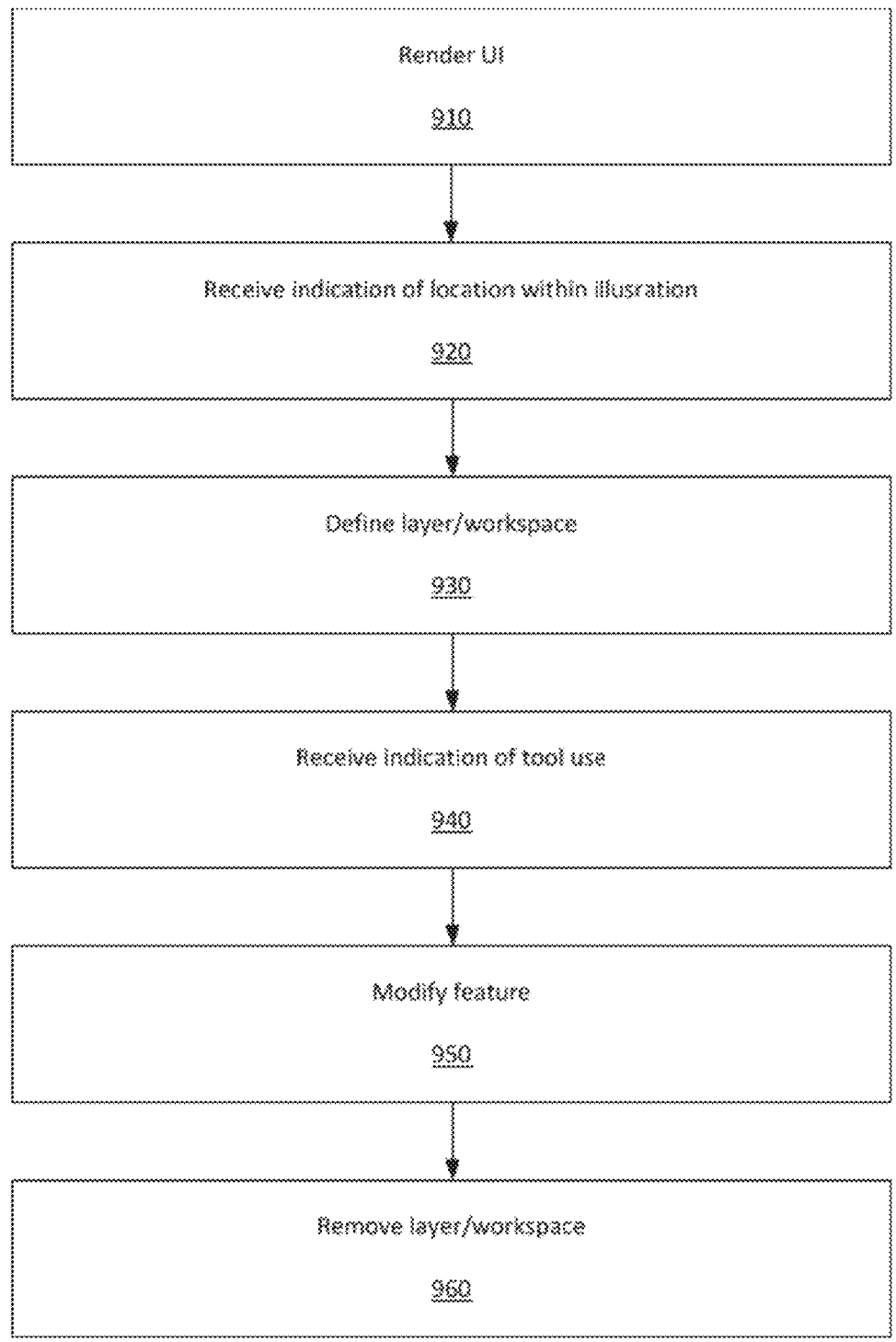
FIG. 9 is a flow chart of a method of altering a digital illustration, according to an embodiment.

FIG. 9 is a flow chart of a method of altering a digital illustration, according to an embodiment. In some embodiments, such a method can be a computer implemented method having instructions stored in a non-transitory medium (e.g., the memory 104) and configured to be executed by a processor (e.g., the processor 102). At 910, a user interface can be rendered. The UI can include an illustration canvas. The UI can further include a toolbar and/or other means for selecting and/or using a tool operable to modify the UI. For example, a toolbar can include representations of various tools, such as a paintbrush tool, a pencil tool, etc. operable to modify the illustration canvas. The illustration canvas can be operable to display a digital illustration.

At 920, an indication of a location within the illustration and/or illustration canvas can be received. For example, an indication of a touch, a click, and/or any other suitable indication can be received, for example, from the input detection module 201. In some instances, the indication can be a signal associated with invoking a shape, such as any one of the shapes 305*a*, 305*b*, 305*c*, 405, and/or 505 as shown and described above. In response, a layer and/or workspace can be defined within the UI, at 930.

In some instances a layer can be defined, at 930. The layer can be analogous to a transparency covering the entirety, or a substantial portion (e.g., more than 75%, more than 90%, or any other suitable amount) of the illustration. The layer can include a filter (e.g., the filtration module 205 can define a filter) that alters a feature of the illustration. In some embodiments, only portion of the layer includes the filter. For example, the layer can overlay the full illustration and a portion of the illustration can pass through the filter such that that portion of the illustration is altered when presented via the UI. In some instances, the filter can overly the portion of the illustration selected by the user such that the selected portion of the illustration is altered by the filter.

In some instances, a workspace or a shape can be defined, at 930. The workspace or shape can overlay the portion of the illustration indicated by the user, at 920. In some instances, all or part of the workspace can include a filter. In addition or alternatively, one or more tools associated with the user interface can have altered functionality within the workspace.

At 940, an indication of a use of a tool can be received. For example, the input detection module 201 can receive an indication of a selection of a tool (e.g., the user can tap a tool on a tool pane) and/or an indication of a use of the tool (e.g., a touch gesture with the tool selected). In some instances, the tool can be used within the workspace and/or filter (e.g., the tool can be used in the area indicated, at 920). In other instances, the tool can be used in an area outside the workspace and/or filter (e.g., at an area mutually exclusive from the area indicated, at 920).

The tool can modify a feature of the illustration, at 950. For example, the tool can mark, erase, or otherwise modify the illustration. In some embodiments, such as embodiments where a layer overlays the illustration, the modification can be made to the layer. Similarly stated, the modification can be distinguished from, stored separately from, and/or selectively removed from the underlying illustration. In some embodiments, such as embodiments where the layer and/or workspace include a filter and the mark is applied to the filtered portion of the illustration, the tool can modify the filtered image. For example, if the filter highlights a feature of the illustration, the tool can modify the highlighted feature. In some such embodiments, the tool can modify the highlighted feature without modifying features that are not highlighted. For example, the tool can modify a feature that is red and/or be inoperable to modify features that are not red.

In some embodiments where the tool is used in the workspace and/or on the layer, the UI can be modified with a secondary functionality of the tool. For example, a pencil tool can have one thickness off the workspace and a second thickness in the workspace.

In some embodiments, the workspace can have different portions having different functionalities. For example, the workspace can be a stencil workspace. The tool can have a first functionality on one portion of the workspace and a second function on the second portion of the workspace. In the stencil example, modifications made on a cut-out portion of the stencil can pass through the workspace, modifying the underlying illustration, while modifications made on a positive-space portion of the stencil can remain on the workspace and not modify the underlying illustration.

At 960, the layer and/or workspace defined at 930 can be removed or dismissed. In some embodiments, the modification made at 950 can persist after the layer and/or workspace is removed at 960. For example, the modification made at 950 can be transformed onto the underlying illustration. In an embodiment where a filter modifies the underlying illustration, the modification made at 950 can be reverse transformed through the filter. In some embodiments, only a portion of the modification made at 950 can persist after the layer and/or workspace is removed. In the stencil example, modifications made on positive space portion of the workspace can be removed from the UI when the workspace is removed, at 960.

It is intended that the methods and apparatus described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Some embodiments described herein relate to digital illustrations. It should be understood that a digital illustration can be or include a digital image, photograph, and/or any other raster or vector image.

What is claimed is:

1. A non-transitory processor readable medium storing code representing instructions to be executed by a processor, the code comprising code to cause the processor to:
   render a graphical user interface including an illustration;
   receive a first signal from an input device indicating a location within the illustration, a first portion of the illustration including the location, a second portion of the illustration mutually exclusive from the first portion and not including the location;
   define a layer in response to receiving the indication of the location, a first portion of the layer associated with the first portion of the illustration having a filter, a second portion of the layer mutually exclusive from the first portion of the layer not having the filter, the filter configured to alter a feature of the illustration to produce an altered feature;
   receive a second signal from the input device indicating a use of a tool on the layer;
   modify the altered feature in response to receiving said second signal indicating the use of the tool;
   define a first control point associated with a first input;
   define a second control point associated with a second input;
   receive a third signal from the input device associated with a pinch gesture, the pinch gesture associated with moving the first control point and the second control point towards a centroid with a velocity below a pre-defined threshold; and
   pin a workspace in the graphical user interface based on the pinch gesture.

2. The non-transitory processor readable medium of claim 1, wherein the input device is a touch-sensitive device.

3. The non-transitory processor readable medium of claim 1, wherein the layer overlays only a portion of the illustration.

4. The non-transitory processor readable medium of claim 1, wherein the tool has a first functionality on the layer and a second functionality off the layer.

5. The non-transitory processor readable medium of claim 1, wherein the tool has a first functionality on the first portion of the layer and a second functionality on the second portion of the layer.

6. The non-transitory processor readable medium of claim 1, the code further comprising code to cause the processor to:
   remove the layer, the feature being modified after the removal of the layer based on the modification of the altered feature.

7. The non-transitory processor readable medium of claim 1, the code further comprising code to cause the processor to:
   remove the layer, a first portion of the feature being modified after the removal of the layer based on the modification of the altered feature, the first portion of the feature being associated with the first portion of the layer, a second portion of the feature being unmodified after the removal of the layer.

8. The non-transitory processor readable medium of claim 1, wherein the filter alters the feature based on a property of the feature.

9. The non-transitory processor readable medium of claim 1, wherein the filter applies at least one of (1) a pixelate effect, (2) a pointilize effect, (3) a magnify effect, (4) a distort effect, or a shader effect.

10. The non-transitory processor readable medium of claim 1, wherein the filter isolates the feature such that a use of the tool modifies the feature without modifying a portion of the illustration that is not the feature.

11. The non-transitory processor readable medium of claim 10, wherein the code further comprising code to:
    remove the layer;
    receive, after removing the layer, the second signal from the input device indicating a use of the tool on the illustration; and
    modify the illustration and the feature in response to receiving the second signal indicating the use of the tool on the illustration, the tool not being configured to modify the feature without modifying the illustration without the layer.

12. A non-transitory processor readable medium storing code representing instructions to be executed by a processor, the code comprising code to cause the processor to:
    render a graphical user interface including an illustration and a tool, the tool configured to edit the illustration, the tool having a first functionality within the graphical user interface;
    receive a first signal from an input device indicating a location within the illustration;
    render a workspace within the graphical user interface in response to receiving the first signal indicating the location, the workspace overlaying a first portion of the illustration including the location but not a second portion of the illustration mutually exclusive from the first portion of the illustration, the tool having a second functionality in the workspace;
    receive a second signal from the input device indicating a use of the tool within the workspace;
    modify the workspace based on the second functionality of the tool;

receive the second signal from the input device indicating a use of the tool on the layer;
define a first control point associated with a first input;
define a second control point associated with a second input;
receive a third signal from the input device associated with a pinch gesture, the pinch gesture associated with moving the first control point and the second control point towards a centroid with a velocity below a pre-defined threshold; and
pin the illustration in the graphical user interface based on the pinch gesture.

13. The non-transitory processor readable medium of claim 12, the code further comprising code to cause the processor to remove the workspace from the graphical user interface such that the modification of the workspace is applied to the illustration.

14. The non-transitory processor readable medium of claim 12, wherein the first functionality of the tool is drawing a line segment having a curvature, and the second functionality of the tool is drawing a straight line.

15. The non-transitory processor readable medium of claim 12, wherein workspace includes a grid, and the second functionality of the tool is drawing a shape snapped to the grid.

16. The non-transitory processor readable medium of claim 12, wherein:
the workspace includes a filter configured to isolate modifications to the illustration;
the first functionality of the tool is an erasing function; and
the second function of the tool is erasing a modification to the illustration, such that the tool is not configured to erase an unmodified portion of the illustration.

17. The non-transitory processor readable medium of claim 12, wherein the second functionality of the tool is to draw a shape that is interpreted as being associated with a letter of the alphabet.

18. The non-transitory processor readable medium of claim 12, further comprising code to cause the processor to:
modify the illustration by performing an inverse transformation of the modification of the workspace.

19. A non-transitory processor readable medium storing code representing instructions to be executed by a processor, the code comprising code to cause the processor to:
render a graphical user interface including an illustration;
receive a first signal from an input device indicating a location within the illustration;
render a workspace within the graphical user interface in response to receiving the first signal indicating the location, the workspace overlaying a first portion of the illustration including the location but not a second portion of the illustration mutually exclusive from the first portion of the illustration, the workspace having a first region and a second region;
receive a second signal from the input device indicating a use of a tool within the workspace;
modify the workspace in response to the indication of use of the tool to produce a modified workspace;
remove the workspace from the graphical user interface such that a first portion of the illustration associated with the first region of the workspace is modified based on the modified workspace and such that a second portion of the illustration associated with the second region of the workspace is unmodified after the removal of the workspace;
receive the second signal from the input device indicating a use of the tool on the layer;
define a first control point associated with a first input;
define a second control point associated with a second input;
receive a third signal from the input device associated with a pinch gesture, the pinch gesture associated with moving the first control point and the second control point towards a centroid with a velocity below a pre-defined threshold; and
pin the workspace in the graphical user interface based on the pinch gesture.

20. The non-transitory processor readable medium of claim 19, wherein the tool is configured to mark the illustration and the workspace.

21. The non-transitory processor readable medium of claim 19, wherein:
the code to cause the processor to receive the first signal from the input device includes code to cause the processor to:
receive the first input associated with the first location of the graphical user interface; and
receive the second input associated with the second location of the graphical user interface; and
the code to cause the processor to define the workspace includes code to cause the processor to define the workspace within the graphical user interface between the first location and the second location.

22. The non-transitory processor readable medium of claim 19, wherein the input device is a touch-sensitive device, the code further comprising code to cause the processor to:
receive, from the input device, a signal associated with a gesture; and
refine a size of the workspace based on the gesture.

* * * * *